United States Patent [19]

Gautier

[11] Patent Number: 4,633,310
[45] Date of Patent: Dec. 30, 1986

[54] METHOD AND DEVICE FOR SECURE TRANSMISSION AND OF TELEVISION PICTURES

[76] Inventor: Christian J. F. Gautier, Le Boulais, 35690 Acigne, France

[21] Appl. No.: 590,708

[22] Filed: Mar. 19, 1984

[30] Foreign Application Priority Data

Mar. 21, 1983 [FR] France ................... 83 05076

[51] Int. Cl.⁴ ............................................. H04N 7/167
[52] U.S. Cl. ..................................... 358/119; 358/123
[58] Field of Search ................ 358/119, 120, 122, 123

[56] References Cited

U.S. PATENT DOCUMENTS

4,070,693  1/1978  Shutterly ...................... 358/122 X
4,245,246  1/1981  Cheung ......................... 358/122 X
4,266,243  5/1981  Shutterly ...................... 358/116 X
4,389,671  6/1983  Posner et al. ................. 358/121 X
4,405,942  9/1983  Block et al. .................... 358/119

Primary Examiner—Stephen C. Buczinski
Assistant Examiner—Linda J. Wallace
Attorney, Agent, or Firm—Laff, Whitesel, Conte & Saret

[57] ABSTRACT

A process for scrambling and unscrambling video signals during transmission begins with a sampled line of video signals. The line is divided into adjacent segments, each of which has at least two samples. The dividing point between the two segments is defined in a pseudo-random manner, synchronously in the transmission and the reception. One of the segments is transmitted in a reversed manner. Upon reception, it is returned into its original direction.

10 Claims, 10 Drawing Figures

FIG.1
VIDEO LINE SIGNALS

FIG. 2
(NORMAL TV SIGNALS)

FIG. 3a
(SCRAMBLED TV SIGNALS)

FIG. 3b
(SCRAMBLED TV SIGNALS)

FIG. 3c
(SCRAMBLED TV SIGNALS)

FIG. 5
UNSCRAMBLING CIRCUIT

METHOD AND DEVICE FOR SECURE TRANSMISSION AND OF TELEVISION PICTURES

The present invention relates to a scrambling and unscrambling process for making it possible for either the transmission or the broadcast of television images, when the signals, which constitute the images, have been subjected at the source to a transformation such that the images are unintelligible during either transmission or broadcast. Upon reception, only a transformation which is the reverse of the preceding one makes it possible to reconstitute the original image.

The invention also relates to circuits which make it possible to execute the scrambling and unscrambling process, respectively at the sending station and in the television receiving sets.

It is recalled that, generally speaking, scrambled television broadcasts are meant for users who are equipped with unscrambling means sufficient to permit them to post on the screen of their receiving sets clear images. The images posted on the screens of the receiving sets of other users are unrecognizable and difficult, if not painful, to watch. The scrambled signal may be carried over any transmission path using the standards which are in force, whether in the ground or broadcast network, cables, or the satellite network.

In practice, a good scrambling is obtained by combining several types of scrambling components. In the present state of the technique, there are three known scrambling components.

A first component brings into play inversions or modulation polarity. In this respect, it is possible to mention the processes described in the French Application. No. 2 330 236, West German Application No. 1 907 580, French Application No. 1 034 776, U.S. Pat. No. 2,972,009 and West German Application No. 1 254 676.

The second and the third scrambling components bring into play position shifts of the information carried by a television image line, with respect to the synchronization signals. Those shifts affect either the totality of the information of the line, causing a simple lag effect, or they affect portions of lines, causing circular shifting effects.

Simple lag effects, which constitute the second scrambling component, make it difficult, if not painful, for the comprehension of the transmission but alone, they do not ensure the confidentiality of the message. That results from the fact that the television image transmission standards do not permit any important shifts between the synchronization information and the image information, without cutting off from the image a length of information equal to the maximum shift. Simple lag effects are provided for in the following patents: French Application No. 2 330 236, West German Application No. 1 907 580, U.S. Pat. No. 2,510,046, U.S. Pat. No. 2,619,530 and West German Application No. 1 254 676. It is also possible to include the effect created in U.S. Pat. No. 2,892,882, where the width of the line synchronization impulse is made to vary between two values.

Circular shift effects, used in French Application No. 2 431 809 and U.S. Pat. No. 4,070,693, ensure a good confidentiality of the message. The use of the circular shift leads, however, in case of an echo in the transmission, to a remaining defect in the line signal, immediately behind the reference burst of the chrominance carrier.

One object of the present invention consists in providing a scrambling process which ensures a confidentiality in quality which is either superior or equal to those processes which use, alone or in combination, the three above-mentioned scrambling processes.

Besides, the study and the putting into place of broadcast satellites has led some European governments to anticipate transmission standards which are different from the present SECAM or PAL standards for the transmission of color TV images. Especially, another system has been proposed, which consists in compressing over time the luminance signal, from 52 microseconds to 40 microseconds, in order to leave, in the normal duration of a 64 microsecond line, space for the transmission of a chrominance signal which occupies 20 microseconds. That system is known in English terminology under the name of, "Multiplexed Analogue Component Signals" or, in short, as the "MAC" system. It is described in an article the title of which is "Standards for Broadcasting Satellite Services", by K. Lucas and M. Windram, and which appeared in the English Technical Journal "IBSA Technical Review", No. 18, March 1982, pp. 12–27, published by the British Society of "Independent Broadcasting Administration" of IBA.

Another object of the present invention consists in providing for a scrambling process which is applicable to the above-mentioned MAC system.

According to a characteristic of the present invention, a process for the scrambling and the unscrambling of the useful signal of a sampled video line has at least one part where the useful signal is cut out or divided into two adjacent segments, the cutting or dividing point between the two segments is defined in a pseudo-random synchronous manner at the transmission and at the reception. One of the transmitted segments is turned around on the spot and, at its reception, the turned around segment is set back into its original or initial direction.

According to another characteristic, the two segments are turned around on the spot when sent, then set back into their initial direction when they are received.

According to another characteristic, to the definition of pseudo-random for the cutting or dividing point between the segments, there is added the pseudo-random selection of the segment or segments to be turned around or not turned around.

According to another characteristic, the segments are, not only adjacent, but they partially overlap in the neighborhood of the dividing or cutting point.

According to another characteristic, upon reception, the forward overlapping section of the second segment is neglected, at reception, at the time of the setting back into the initial direction of the turned around segment or segments.

According to another characteristic, a scrambling device comprises two sample memories, each one having the capacity of one line of video signal, a writing memory means to memorize in their natural order the samples of each video line to be scrambled, alternately in one of the memories. Reading governing means are provided for the memories in order to alternately read at least one part of the memorized samples in a reverse order relative to the order of input.

According to another characteristic, an unscrambling device comprises two sample memories, each one of them having the capacity of one video signal line. Governing reading means for the memories alternately read into them the samples, in their natural order, to memorize each video signal line which has been scrambled. The writing governing means are provided to write at least one part of the samples in a reverse order relative to the order of their arrival.

According to another characteristic, a system is made up of such scrambling and unscrambling devices, which comprises, in the scrambling device, a key generator and in the unscrambling device or devices, a key receiver. The key defines, through a pseudo-random sequence generator respectively provided for in all of the devices, the rank of the samples between which the cutting or division is placed.

The characteristics of the invention which have been indicated above, as well as others, will appear more clearly upon reading of the following description of an embodiment of the invention, the description being given in connection with the attached drawings, in which.

Figure 1:
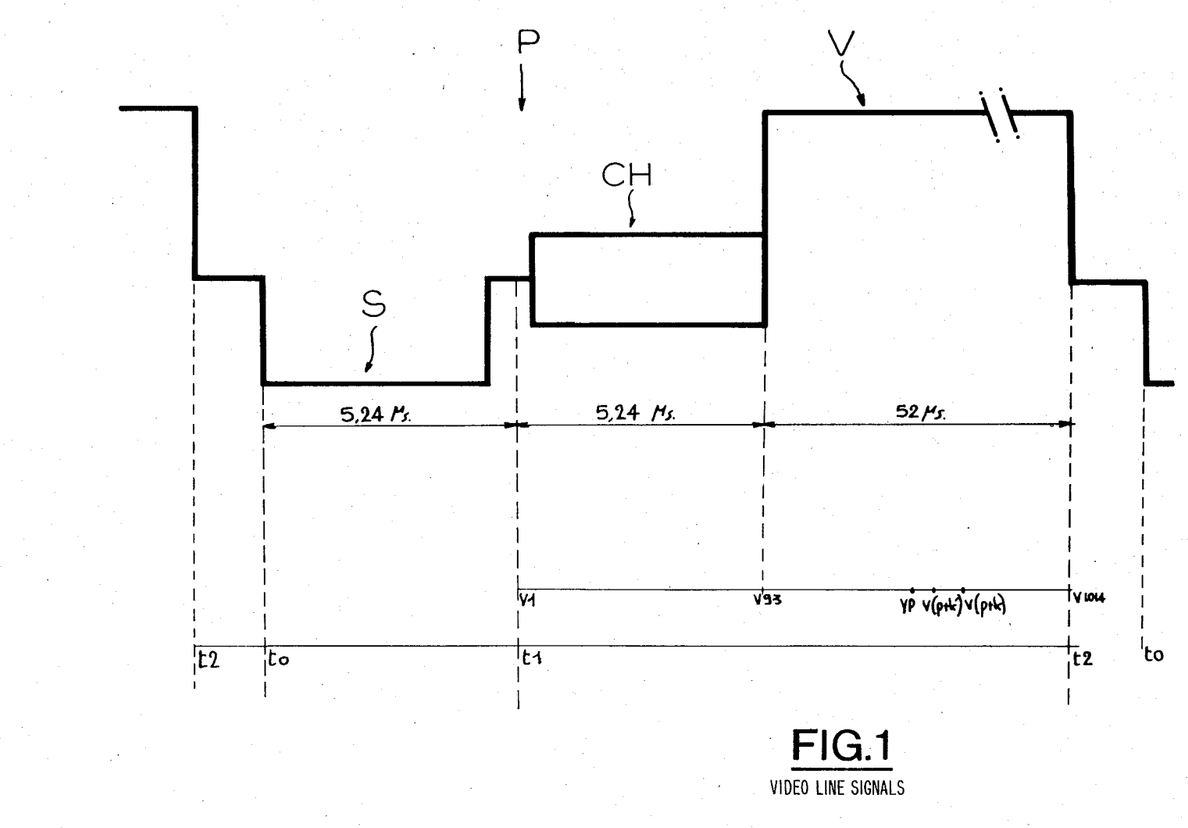
FIG. 1 is a schematic diagram of a video signal line, which makes it possible to identify certain non-variable time positions of the signal.

FIG. 1 represents a video signal line having a positive polarity, comprising the line synchronization impulse S, the elimination level P, the chrominance burst CH and the useful signal V. The original time t0 of the periods corresponds to the front or leading edge of the synchronization signal S. Between time t2, corresponding to the beginning of the suppression level, and time t1, immediately preceding the beginning of the reference burst, the video signal still is directly transmitted, that is to say, sampled, but without passage into the memory. The time elapsed between t0 and t1 is 5.24 microseconds. The chrominance burst, which ends 5.24 microseconds after t1, is sampled, then put into memory, as is the remainder of the non-scrambled line. Scrambling essentially bears on the useful signal V, which ends at time t2, that is to say 52 microseconds after the end of burst CH. Signal V is sampled, then written into memory, in order to be, partially at least, read in an order which is different from the one it was written in. The unit formed by signals CH and V is sampled on 1014 useful samples, sampling being done, for example, at the frequency of 17,734 MHz, which corresponds to 11235 times the line frequency HL. Under those conditions, samples V1 to V92 correspond to the reference burst CH, while samples V93 to V1014 form the useful signal V.

Figure 2:
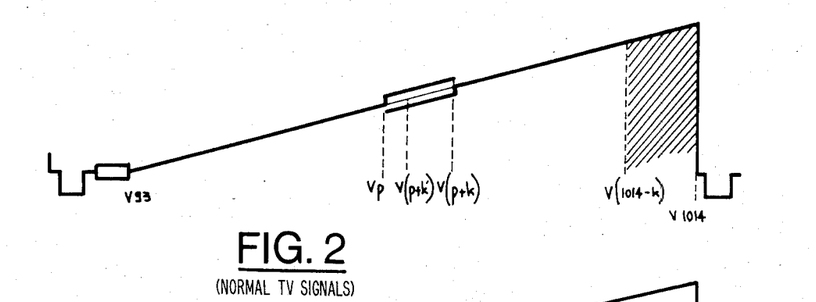
FIG. 2 is a schematic diagram of a video signal line, prior to coding.

It is, of course, understood that the process according to the present invention would just as well apply to a video signal of negative polarity. In FIG. 1, there has been given to signal V an arbitrary constant form since FIG. 1 especially has as its object to mark the reference times t0, t1 and t2 of the video signal. In FIG. 2, which also represents a complete video signal, there was given to the useful signal V an arbitrary form which increases in a linear manner, because it makes possible, in relationship with FIGS. 3a to 3c, a very simple illustration of the scrambling process according to the present invention.

It is, therefore, necessary to note that the transformation, according to the process of the invention, applies to a sampled video signal. The samples may be in an analog form, or they may be in coded numerical form. The sampling frequency of 17.734 MHz of course takes into account Shannon's rule as a function of the passing band of the signal. In a television system with standards of 625 lines and 25 images a second, that is to say a duration of 654 seconds, a minimum sampling frequency of 12 MHz may be sufficient. However, in order to simplify filtering, and in order to make possible the use of memories of usual capacities, there has been chosen a higher sampling frequency which leads to 1024 samples, of which 1014 are useful ones.

In FIG. 2, there has been indicated on the useful signal V a running sample Vp, as well as the samples V(p+k') and V(p+k), as well as the sample V(1014−k). There will be seen later the parts played by k and k'.

Figures 3A, 3B:
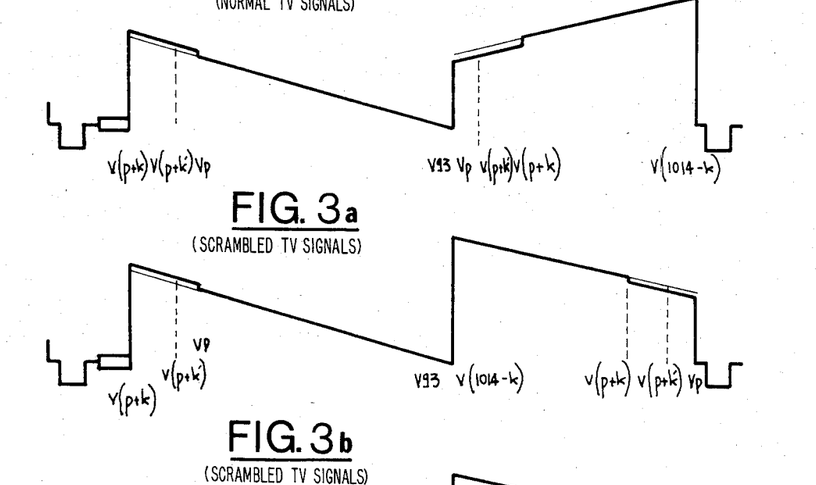
FIGS. 3a to 3c are schematic diagrams of three video signal lines, scrambled according to the present invention.

FIG. 3a shows the transformed line, from the line in FIG. 2, according to the inventive mode of transformation. The useful signal of the transformed line comprises a first part which is composed of samples V(p+k) to V93 and of a second part formed of samples V(p) to V(1014−k). Of course, the sample V(p) immediately follows sample V93. In another form, the transformation which ends with the line in FIG. 3a consists in reversing the V93 to V(p+k) segment and in keeping almost intact the V(p) to V(1014) segment, since there is only taken away from it the k samples in front of V(1014).

In FIG. 3b, there is shown the transformed line (obtained) from the line in FIG. 2, according to another inventive mode of transformation. The useful signal of the transformed line comprises a first part which is formed of the samples V(p+k) to V93, and a second part which is formed of the samples V(1014−k) to V(p). Of course, sample V(1014−k) immediately follows sample V93. In another form, the transformation which leads (ends with) the line in FIG. 3b consists in reversing at that very place, the two segments.

Figure 3C:
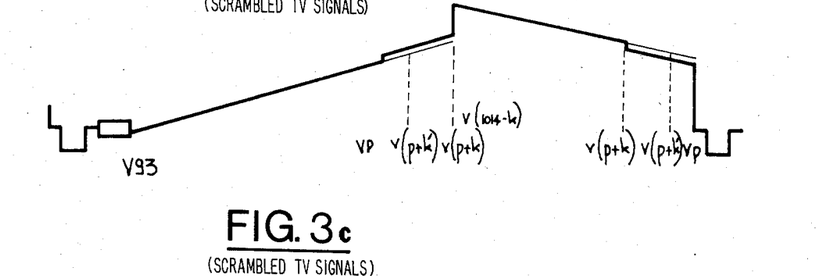

In FIG. 3c, there has been shown the transformed line obtained from the line in FIG. 2, according to a third inventive mode of transformation. The useful signal of the transformed line comprises a first part which is composed of the samples V1 to V(p+k), and a second part which is composed of the samples V(1014−k) to V(p). Of course, sample V(1014−p) still immediately follows sample V(p+k). In this case, the first segment has been preserved intact and the second one has been reversed.

The p rank of sample V p which defines the cutting or dividing point between the segments varies from one line to the next, in a pseudo-random manner. In practice, it is not indispensable to retain as many p values as there are samples in the useful signal, but rather $2^i$ groups of values, each group comprising a number $2^j$ of samples, j being, for example, equal to 2, 3 or 4 and, in the example being described, $i=10-j$. As shown in FIGS. 2 and 3a to 3c, there are, in fact, four combinations of segments which are available for the transmission of each line.

Upon reception, the reversed segments are put back into their initial or original direction. In order to obtain that result, the receiving unit must know, for each line, the p rank and what combination, among the four ones, has been used.

Figure 4:
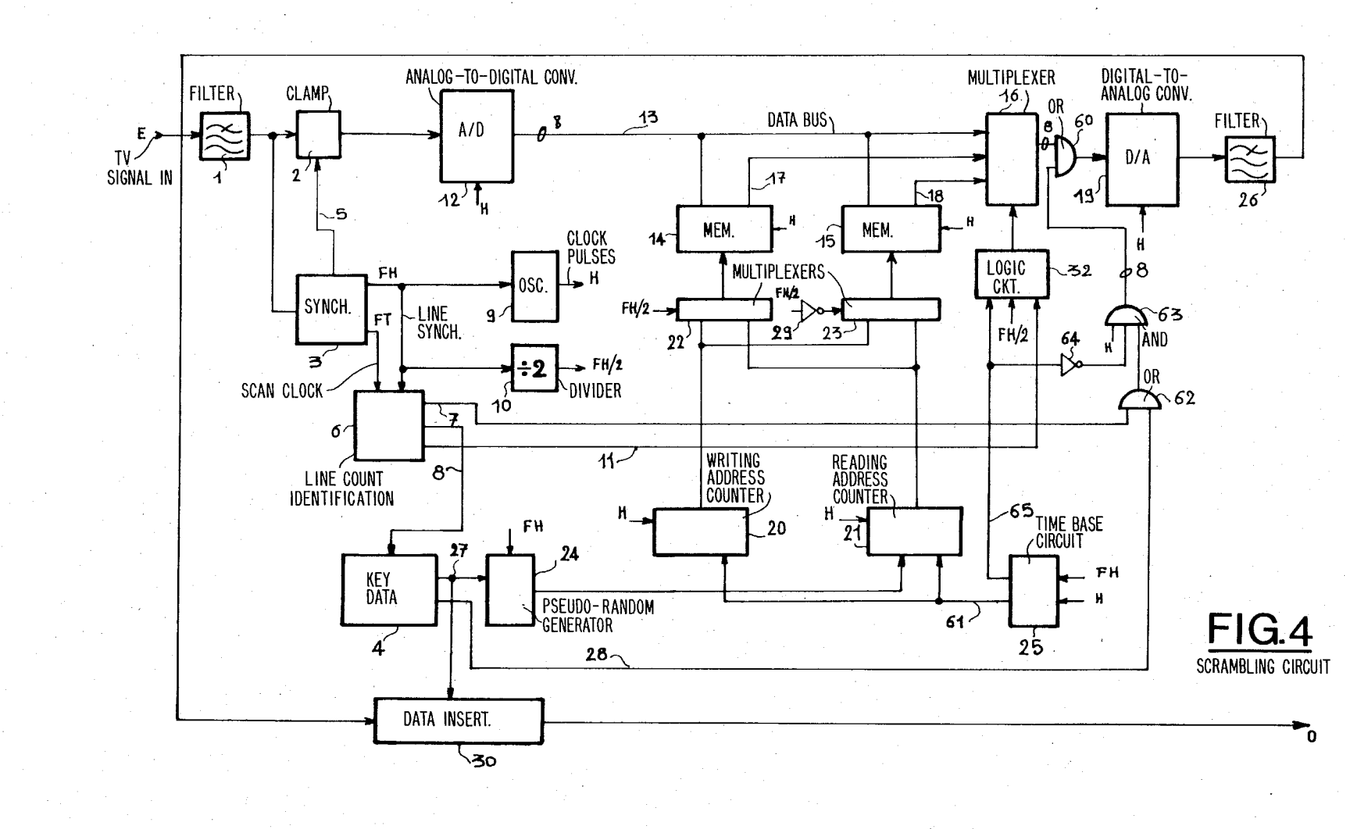
FIG. 4 is the block-diagram of a scrambling circuit for the source of the transmission.

In the scrambling circuit represented in FIG. 4, the analog video signal to be scrambled is introduced by connection E into a filtering and adaptation circuit 1. Circuit 1 is first of all a filter which performs the frequential calibrating of the signal from 0 to 6 MHz. That filtering is necessary prior to the sampling, in order to avoid the spectrum recoiling phenomena. Circuit 1 also executes an adaptation, delivering at its output a signal under a low impedance.

The output of signal 1 is connected, in parallel, to the inputs of a clamping circuit 2 and of a synchronization extraction circuit 3. Clamping circuit 2 is meant to give a continuous reference to the analog video circuit. It receives, through connection 5 and from circuit 3, the switching signal on the reference level on which there will be lined up the bottoms of the line synchronization X.

Circuit 3 extracts from the incident analog video signal time informations which are the line synchronization signals and the scam synchronization signals, and it develops the switching signal which is transmitted, through line 5, to clamping circuit 2. Such a circuit is commercially available under Reference No. TDA9400 or TDA 9500, sold by the ITT Semiconductors firm. Circuit 3 has an FT output for the scan clock synchronization, and an output FH for the line synchronization. Those outputs are connected to the inputs of a line identification circuit 6.

Circuit 6 is a line counting device, one output 7 of which delivers characteristic signals of identification of lines 17 an 623, an output 8 and an output 11 which identifies the scan suppression lines. Output FH is connected to the input of the governing input for the controlling of an oscillator 9 which preferably is of the auxiliary oscillator type, and which is provided to generate a clock at the frequency of 1135 FH, that is to say again 17.734 MHz. Oscillator 9 has an output H which delivers the sampling clock or general point clock.

The FH output of 3 is further connected to the input of a divider-by-two 10 the output FH/2 of which delivers a frequency signal which is one-half of the line frequency and the use of which will be seen later.

The output of clamping circuit 2 is connected to the input of an analog/digital converter 12 the clock input of which is connected to the output of 9. Thus, the A/D 12 converter samples the video at 1135 FH and it quantifies the samples which are obtained.

The numerical output of converter 12 is connected, through a data bus 13, which has as many wires as it has bits, per sample, to two memories 14 and 15, and to an input of a multiplexer 16. Memories 14 and 15, respectively, are further connected by means of data busses 17 and 18, to two other inputs of multiplexer 16.

The output of multiplexer 16 is connected to an input of an OR gate 60, the output of which is connected to the input of a digital/analog converter 19, the clock input H of which is connected to 9. The analog output of D/A converter 19 is connected to the input of a correction and filtering circuit 26. Circuit 26 corrects the weakening of the high frequencies of the useful signal, and it elimintes the undesirable residues produced by the sampling.

The scrambling ciructuit in FIG. 4 further comprises a writing address counter 20 and a reading address counter 21. The output of writing counter 20 is connected to the first input of two multiplexers 22 and 23, respectively, associated with memories 14 and 15. In a similar manner, the output of reading counter 21 is connected to the second input of multiplexers 22 and 23. The governing input of multiplexer 22 is connected to the output of divider 10.

Writing counter 20 has its authorization input connected to the output 61 of a line time base 25, and its clock input connected to H. When counter 20 is enabled, it counts from 93 to 1014.

Reading counter 21 has its authorization input connected to the output 61 of the line time base 25, its clock input connected to H, and a loading input connected to the output of a pseudo-random sequence generator 24. When counter 21 is enabled, it counts as a function of the number of p supplied by the generator 24, in a manner which will be described below.

The pseudo-random sequence generator 24 has a key loading input 27 connected to a corresponding output of a circuit 4.

Multiplexer 22 has its governing input directly connected to the FH/2 output of divider 10, while multiplexer 23 has its governing input connected to the same FH/2 output through an inverter 29. Thus, for the lines of a parity, multiplexer 22 transmits the writing addresses from 20 to the memory 14, while multiplexer 23 transmits the reading addresses 21 to memory 15, and for the lines of the other parity, those states are reversed.

Circuit 4 is a circuit which produces the data which the receiver needs in order for it to find the unscrambling key. Through connection 8, it receives from the line identification circuit 6, the information of time position of lines 310 and 622. It delivers, through line 27, for one part to generator 24, the data of the unscrambling key and, for the other part, to a data insertion circuit 30, the same data of the key. Circuit 4 has another output 28 which makes it possible for it to signal each change of key to the receiver. To that end, output 28 is connected to the input of an OR gate 62 the output of which is connected to an input of an AND gate 63 with three inputs, the second input of which is connected to clock H, the third input of which is connected, by means of an inverter 64, to an output 65 of the line time base 25, and the output of which is connected to the second input of the OR gate 60. The second input of the OR gate 62 is connected to the output 7 of the line identification circuit 6. With respect to the structure of circuit 4, reference will be made to the description of French Pat. No. 2 459 595.

The line time base 25 moreover has its output 65 connected to a first input of a logical circuit 32, the output of which is connected to the governing input of multiplexer 16. The second and third inputs of the logical circuit 32, respectively, are connected to the outputs FH/2 of divider 10 and 11 of the line counter 6.

The line time base 25 has a clock input H and an input for setting back to zero connected to the FH output of 3. Circuit 25 is a counter, the output 61 of which is activated at the count, which corresponds to t1, which serves to start the counters 20 and 21, and the output 65 of which is at "1" for the counts corresponding to t0 to 51 and t2 to t0.

The output of filter 26 is connected to the input of the data insertion circuit 30, the output of which delivers the scrambled video signal toward the receivers, that signal serving as a modulation signal for a suitable carrier. Circuit 30 is a classical data insertion circuit in a video signal, as provided for by the DIDON system. In the present application, the inserted data are the key data received from circuit 4 through its output 27.

Figure 5:
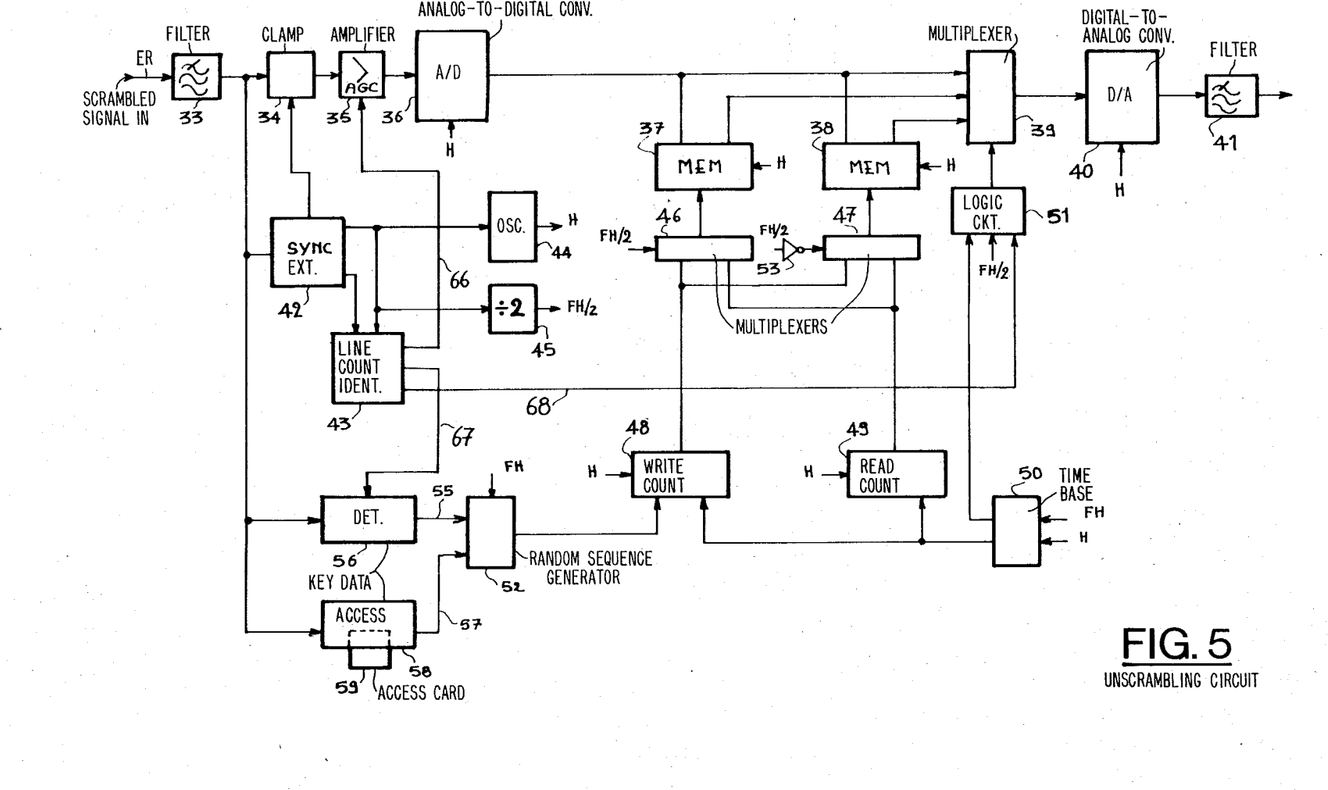
FIG. 5 is the block-diagram of an unscrambling circuit of the receiver.

In the unscrambling circuit in FIG. 5, the analog video signal which is scrambled and is received from the scrambling circuit in FIG. 4, is introduced through the connection Er. The unscrambling circuit in FIG. 5 comprises numerous elementary circuits, either identical or similar to those of the scrambling circuit. Indeed, there is found in it, an input filter 33, a clamping circuit 34, an analog/digital converter 36, two sample memories 37 and 38, a three input multiplexer 39, a digital/analog converter 40, an output filter 41, a synchronization extraction circuit 42, a line counter 43, a controlled oscillator 44, a divider by 2, 45, two multiplexers with two inputs 46 and 47, a writing counter 48, a reading counter 49, a line time base 50, a logical circuit 51, and an random sequence generator 52, the corresponding circuits in FIG. 4 being the circuits 1, 2, 12, 14, 15, 16, 19, 26, 3, 6, 9, 10, 22, 23, 20, 21, 25, 32 and 24. All of the interconnections between corresponding circuits are practically the same ones. However, there will be noted that between the output of clamping circuit 34 and the input of the A/N converter 36, there is mounted in series an amplifier with CAG 35, and that the ouput of multiplexer 39 is directly connected to the input of the D/A converter 40. Finally, the ouput of filter 41 constitutes the output of the descrambling circuit. In addition, circuit 4 is replaced by two circuits 56 and 58, and circuit 30 obviously is eliminated.

The line identification circuit still has three outputs 66, 67 and 68, output 66 delivering the identification signals of lines 17 and 623 and being connected to the governing input of amplifier 34, the output 67 delivering the identification signals of lines 310 and 622 and being connected to the governing input of circuit 56, and output 68 delivering the scan elimination signal and being connected to an input of the logical circuit 51.

The pseudo-random sequence generator 52 has an initialization governing input 55, which is connected to the output of the key synchronization detection 56 and a key loading input 57, which is connected to the output of an access control circuit 58, to which there is associated, an access card 59. The inputs of circuits 56 and 58 are connected to the output of filter 33.

In practice, the access control circuit 58 is a DIDON data receiver the description of which can be found in French Pat. No. 2 313 825. Circuit 58 receives the complete video signal from filter 33, it draws out of the data transmitted in certain lines of scan elimination affected to that service, the key calculation data which have been transmitted, it combines them with the data recorded on the subscription card 59, as described in French Pat. No. 2,459,595, and finally, it presents at its output, what has been agreed to call the key.

The key synchronization detection circuit 56 also receives the complete video signal from filter 33. In addition, line counter 43 activates it at each video line 310 or 662. When circuit 56 detects that the line is the level of the space, it transmits to the random sequence generator 52, a signal of initialization which starts in generator 52, the loading of the key which is present at the output of circuit 58.

Between two loadings of the key, the shift register or registers of generator 52 operate using, as a clock, the line frequency clock FH. Thus, at each television line, generator 52 delivers at its output a number p which defines the cut-off between the segments of the diagram in FIG. 2 and a number found between 0 and 3 which indicates whether the signal in FIG. 2 has been transmitted intact, or whether it has been subjected to one of the three transformations leading to the scrambled signals which are seen in FIGS. 3a to 3c.

In practice, the treatment of the data in circuits 4 and 58 is carried out by the software of a microprocessor contained in each one of those circuits.

There will now be described the functioning of the circuit in FIG. 4. The line counter 6 first of all defines the scan elimination signal, during which the image is not scrambled. That signal is transmitted by connection 11 toward logical circuit 32, which then governs the multiplexer 16 in a manner such that the numerical signals delivered by the A/D converter 12 will be transmitted directly to converter D/A 19.

In addition, as already indicated in the description of FIG. 1, between the times 52 and 51, the signal must also be transmitted without scrambling. To that end, the line time base 25, which is set back to zero by FH at each time 50, activates its output 65 while the counts which correspond to the interval t2-t1, so that the logical circuit 32 governs the multiplexer 16 in a manner such that it directly transmits the samples coming from 12, toward 19, as for the elimination of the scan.

It will be assumed that, for lines bearing an uneven number, the FH/2 signal is at the high level so that multiplexer 22 is governed in a manner such that the samples produced by the converter 12 will be written in memory 14 under control of the writing counter 20, while multiplexer 23 places memory 18 under control of the reading counter 21 and while the logical circuit 32 governs multiplexer 16 so that it will let the samples read in memory 15 pass toward converter D/A 19. For the lines bearing an even number, there obviously is a practically symmetrical condition, multiplexer 16 letting pass those samples which are read in memory 14.

At time 51, the line time base 25 sets back to zero the writing counter 20 which then delivers the address of writing of the samples in memory 14 or 15, the writing addresses being in their natural order.

At time t1, the line time base 25 also sets back reading counter 21 to zero. The latter counts in the natural order up to 92, so that the reference burst CH is transmitted without scrambling from memory 14 or 15. Afterwards, counter 21 performs a jump which is a function both of the number of p delivered by pseudo-random generator 24 and of the mode of transformation chosen from among the four possible ones. In the non-transformed mode in FIG. 2, counter 21 continues to count naturally, without any jump.

In the scrambling mode illustrating in FIG. 3a, from address 92, the reading of the memory is then done at address (p+k), then counter 21 is decremented until address 93, then the address jumps to p and finally the counter is incremented until address (1014−k). It is necessary to note here that the pseudo-random generator 24 is capable of delivering any number of p's between 1 and 1024, something which, without any precaution, would position the cut off outside the V93 to V1014 zone represented in FIG. 1. That is why reading counter 21 comprises means to add 128 to the number p supplied by 24 when the latter is inferior to 93, and to cut off 16 from that number which is supplied when the latter is inferior to 104.

In the mode of scrambling illustrated in FIG. 3b, from address 92, reading of the memory is first done at address (p+k), then counter 21 is decremented until address 93, then the counter jumps to address (1014+k) and, finally, the counter is decremented up to address p.

In the mode of scrambling, illustrated in FIG. 3c, starting from address 92, a reading of the memory is first done at address 93, then the counter is incremented until address (p+k), then the address jumps to address (1014−k) and, finally, the counter is decremented to address p.

The functioning of the receiving circuit represented in FIG. 5 obviously is similar to the one which has just been described. The line counter 43, the line time base 50, the logical circuit 51, and the multiplexers 46 and 47 function as circuits 6, 25, 32, 22 and 23 function with respect to the scan elimination and the t2 to t1 intervals.

At the time t1, the line time base 50 sets the writing counter 48 back to zero. The latter counts in the natural order up to 92, so that the reference burst CH is put into memory without any scrambling, either in memory 37 or in memory 38. Afterwards, counter 48 performs a jump similar to the jump performed in reading in the sending circuit, in FIG. 4.

More specifically in the manner represented in FIG. 2, counter 38 is, starting from address 93, incremented until 1014.

In the manner represented in FIG. 3a, starting from address 92, the writing in the memory is first done at address (p+k), then counter 48 is decremented until address 93, then the counter sends no writing address during k'strokes of the clock, then it jumps to the address (p+k+1) and finally it is incremented until address (1014−k).

In the mode of scrambling illustrated in FIG. 3b, starting from address 92, the writing into the memory is first done at address (p+k), then counter 48 is decremented until address 93, then the counter jumps to the address (1014−k) and finally it is decremented until address (p+k').

At time t1, the line time base 50 sets back to zero the reading counter 48 which delivers the reading addresses of the samples in memory 37 or 38, the reading addresses being in the natural order.

Of course the numbers k and k' may be adjusted, by hand for example, in counter 21 and 4, in order to take into account the real conditions of propagation.

In the scrambling circuit represented in FIG. 4, when, for example, line 17 appears, the output 7 of the line counter 6 is activated, so that the output of the OR gate 62 is activated. When the output 65 of the line time base 25 is deactivated, that is to say, during the CH burst and the useful signal V, the output of inverter 64 is activated. Therefore, the AND gate 63 transmits the clock impulses to the OR gate 60 which transmits them, to the D/A converter 19. In practice, as converter A/D 12 is supposed to convert the samples on eight bits, there obviously are eight OR gates 60. In another form, between t1 and t2, for line 17, all of the samples received by the D/A converter 19 are of maximum value. Line 17 sent by 19 therefore will be entirely at the level of space.

In the unscrambling circuit, the line counter 43 signals through 66, to the amplifier 35 that it must take into consideration the maximum level transmitted on line 17. Thus, the amplifier circuit with automatic gain control, 35, can define its gain in a manner such that the dynamics of the signal transmitted to A/D converter 36 will be compatible with that of the latter.

In the case of a change of key by circuit 4, connection 8 transmits a signal of identification of line 310, for example, something which then brings about the activation of output 28, which activates the output of OR gate 62. There is then found again for line 310, a functioning identical with that which has just been described for line 17. That line 310, therefore, is transmitted at the level of space. In the receiver, for each line 310, circuit 56 is alerted by a connection 67. When a continuous space level is received, connection 55 is activated, causing the change of key in 52. Of course, the new key had first been transmitted from 4 toward 58, through 30.

Figures 6, 7:
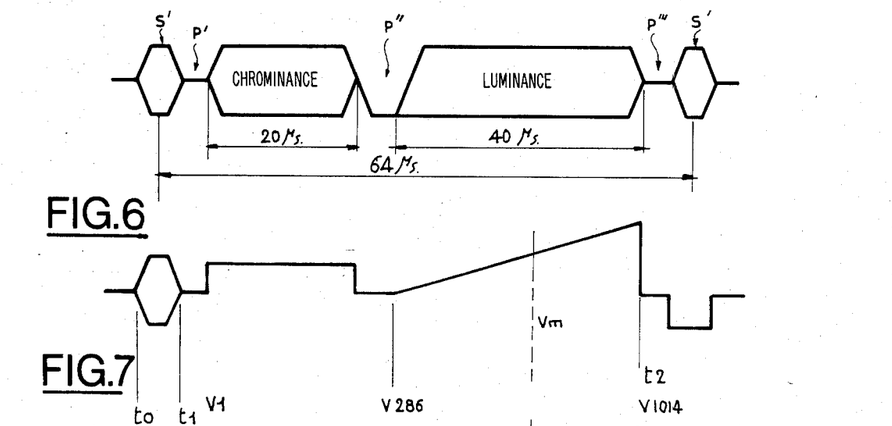
FIG. 6 is a schematic diagram of a MAC signal line.
FIGS. 7 and 8 are schematic diagrams of the signal in FIG. 6, before and after scrambling according to one of the modes of operation of the present invention.

FIG. 6 shows a MAC line video signal, such as defined when it was mentioned in the introduction. That MAC signal is composed of a line synchronization word "s", of a chrominance signal having a 20 microsecond duration and of a luminance signal, the duration of which is 40 microseconds. Those signals respectively are separated by clamping levels of P1, P11, P111. A MAC signal distinguishes from a SECAM signal, for example, in that the chrominance no longer modulates in frequency the luminance signal, but is completely distinct from it in time. In order to achieve that separation, the luminance signal was compressed over time from 52 to 40 microseconds, something which, of course, brings about a widening of the passing band, but which frees, by recovering the duration of the SECAM or PAL REFERENCE burst, 20 microseconds to lodge chrominance. The latter is more compressed over time than is luminance. Of course, at a given time of the chrominance signal there corresponds a time of the luminance signal.

In FIG. 7 there has been transposed the drawing of FIG. 7 to find again a drawing similar to that in FIG. 2.

In FIG. 7, it is possible to scramble the luminance signal of FIG. 7, by making a cut or division between samples V286 and V1014. The circuit in FIG. 4 may prove suitable for that operation, by modifying in counter 21 the calculation logic of the cutting or dividing point. Indeed, here it is necessary to calculate point m by adding, for example, 384 to the number delivered by the pseudo-random generator, when that number is less than 286.

Figure 8:
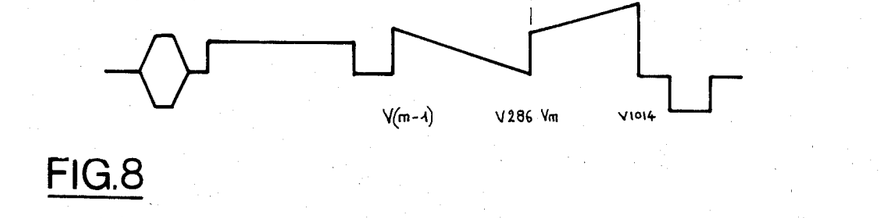

FIG. 8 shows the signal of FIG. 7, scrambled according to the mode represented in FIG. 3a. Of course, in reality, means would also be provided for recoveries.

As already stated above, to the Vm luminance sample, there is a corresponding and similarly positioned sample that is in the chrominance signal. It would, thus, be possible to provide, on the chrominance, for a scrambling which may or may not be similarly positioned with respect to the luminance one, using only one key, a single pseudo-random generator, but two sets of writing and reading counters.

The above-indicated considerations, with respect to the MAC signal show, in addition, that it is possible, even in a traditional signal, easily to modify the limits between which the signal can be scrambled according to the present invention. That shows that it is possible to selectively scramble only one vertical band of a television image, something which, at times, may be useful.

Those who are skilled in the art will readily perceive how to modify the invention. Therefore, the appended claims are to be construed to cover all equivalent structures which fall within the true scope and spirit of the invention.

I claim:

1. A process for scrambling and unscrambling a useful signal comprising a sampled line of video signals, said process comprising the steps of:
   (a) dividing at least one part of said useful signal into segments which are adjacent, each one of the segments comprising at least two samples, the dividing point between the two segments being defined in a pseudo-random manner synchronously in the transmission and the reception;
   (b) transmitting one of the segments in a reversed manner; and
   (c) upon reception, returning said reversed segment into the original direction.

2. A process according to claim 1 and the added steps of:
   reversing two segments at the time of transmission; and
   returning said two reversed segments into their original direction at their reception.

3. A process according to claims 1 or 2 and the added step of:
   adding to the pseudo-random definition of the dividing point between the segments the pseudo-random selection of at least one segment which is to be reversed.

4. A process according to one of the claims 1 or 2 and the added step of:
   selecting the dividing points between adjacent segments to be slightly overlapping in the neighborhood of the dividing point, so that the scrambled signal can be transmitted in a network with a limited frequency band, whereby signals may be transmitted in existing networks, regardless of the form of modulation and control in said existing network.

5. A process according to claim 4 and the added steps, upon reception, of:
   neglecting the front portion of the overlapping in the second segment when the at least one reversed segment is returned into its original direction.

6. A process according to one of the claims 1 or 2 and the added step of:
   scrambling both a luminance signal and a chrominance signal.

7. A process according to one of the claims 1 or 2 and the added steps of using:
   two sample memories, in a scrambling circuit, each of said sample memories having a capacity of one line of video signal, writing governing means for writing, in their natural order, the samples of each line of video signals to be scrambled, said memories being written into alternately; and
   governing means for reading the memories, said reading governing means alternately reading in at least a part of the samples stored in said memories, in an order which is the reverse of the order of input.

8. A process according to one of the claims 1 or 2 and the added steps of using:
   two memories for samples in an unscrambling circuit, each one of said memories having the capacity of one line of video signal;
   governing means for alternately reading the memories in an order which reads out the samples in their natural order;
   writing governing means for memorizing each line of video signals which has been scrambled, said writing governing means causing a reading of at least one part of the samples in an order which is the reverse of the order of their arrival.

9. A system constituted by a scrambling device according to claim 7 further comprising in the scrambling device a key generator.

10. The process of claim 9 and a key receiver means in the unscrambling device, said key receiver providing a pseudo-random sequence generator which ranks the samples between which said division takes place.

* * * * *